Oct. 28, 1952 R. STANTON 2,615,907
SOLID-LIQUID REACTION PROCESSES
Filed March 11, 1947 2 SHEETS—SHEET 1
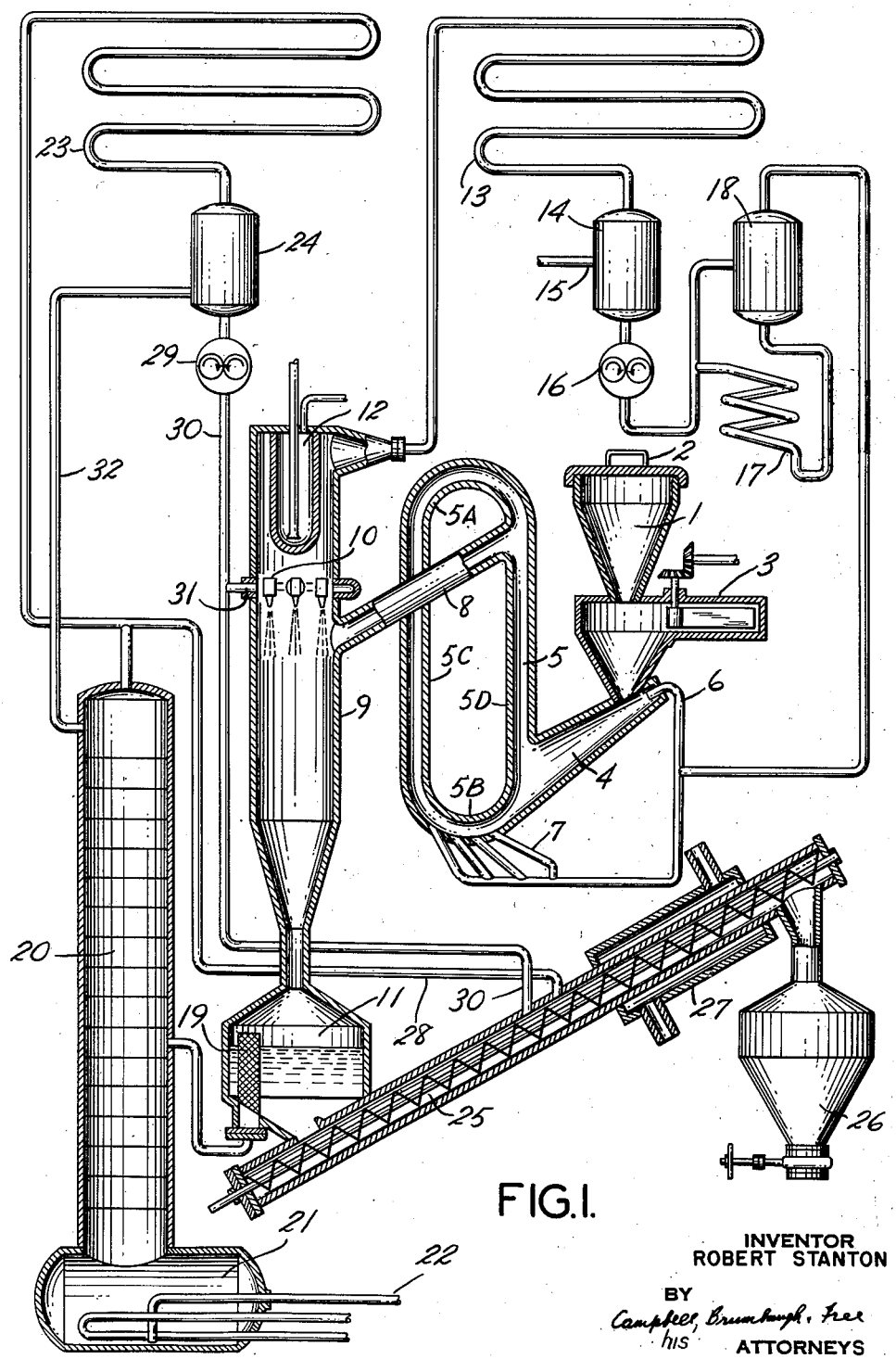
FIG.I.
INVENTOR
ROBERT STANTON
BY
Campbell, Brumbaugh, Free
his ATTORNEYS

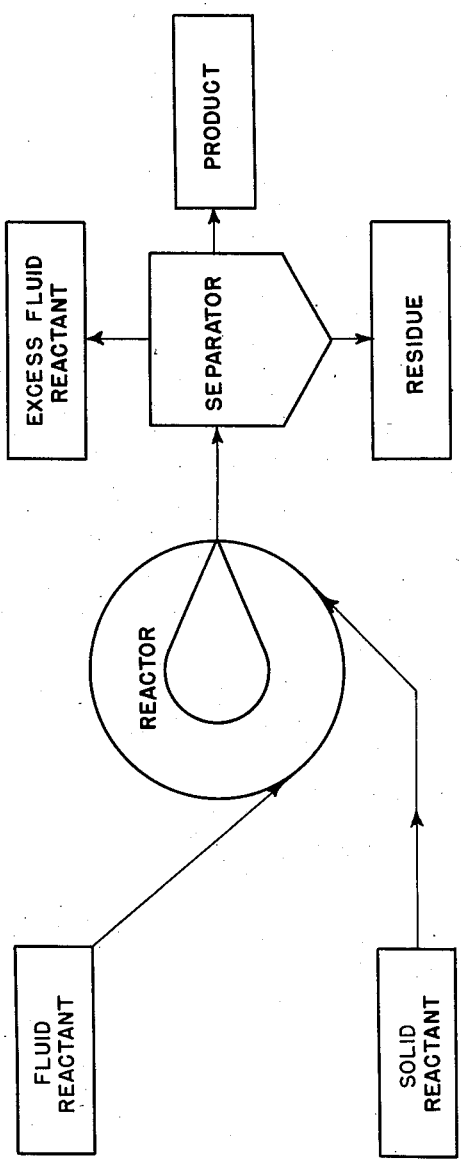

Patented Oct. 28, 1952

2,615,907

UNITED STATES PATENT OFFICE 2,615,907

SOLID-LIQUID REACTION PROCESSES

Robert Stanton, Denver City, Colo.

Application March 11, 1947, Serial No. 733,746

11 Claims. (Cl. 260—437)

This invention relates to reaction processes involving a reactant in the form of a frangible solid and a reactant in the form of a liquid, more particularly to such processes wherein both the solid reactant and the liquid reactant are brought together continuously, and it specifically relates to such processes wherein both the solid reactant and the liquid reactant are introduced into a reaction zone continuously; the reaction is conducted continuously under high speed agitation induced by fluid propulsion acting upon the solid reactant particles to impart high speed thereto while the movement of the reactant particles is regulated so that the high speed solid particles undergo high energy collisions.

Many usual processes of reacting a solid with a fluid reactant involve large reaction vessels, relatively slow and difficultly regulated reaction procedure, and relatively large reaction mixtures. In some cases, health hazards such as explosions or the escape of toxic fumes are present.

In accordance with the invention, it has been found that such processes can be conducted in a rapid and relatively safe, readily regulated manner, with improved yields. Small reaction mixtures are suitable. The new processes may be conducted in a fully continuous manner and give a highly desirable product.

The objects achieved in accordance with the invention include the provision of a process whereby the reaction of a solid reactant and a fluid reactant may be conducted in a continuous manner in a relatively small reaction zone; provision of a process for the preparation of alkylated lead by the reaction of a lead-alkali alloy with alkyl halide in a continuous manner wherein relatively small proportions of both reactants are involved at any one time; the provision of a process for the preparation of tetraethyl lead by the reaction of coarsely divided sodium alloy with ethyl chloride in a continuous manner wherein relatively small proportions of the reactants are involved at any one time and wherein the particle size of the alloy is reduced as the reaction proceeds; and other objects which will be apparent as details and embodiments of the invention are set forth hereinafter.

In accordance with the invention, a reactant in the form of a coarsely divided solid is mixed with another reactant which is in the form of a fluid, under high speed agitation induced by fluid propulsion, and the movement of the reactants is regulated so that the solid particles undergo high energy collisions; all under reaction temperature and pressure conditions.

In an embodiment of the invention, the reaction mass moves through a curved path; and the influence of the centrifugal force will cause the larger solid particles to travel near the outer periphery of the curved path and compress the reactants, and will cause the reacted smaller or lighter particles to remain near the inner periphery of the curved path. While the chemical reaction is occurring, there will also be a reduction in size of the larger particles due to the grinding action of the high energy collisions in the system. The reaction process takes place rapidly and the final reaction products and residue will be in a finely divided state near the inner periphery of the curved path.

A substantially completely reacted and more finely divided portion of the reaction mixture is removed from the inner periphery and then processed to recover reaction products, unconsumed reactants and by-products or residues.

The process may be conducted in a fully continuous manner, in a partially continuous or intermittent manner, or in a batch type process. The fully continuous process is preferred for commercial operation.

In order to facilitate a clear understanding of the invention, reference may be had to the accompanying drawings in which:

Figure 1 illustrates an arrangement of an apparatus, partially diagrammatical and partially in section, which may be employed for conducting the process of the invention, e. g., in the manufacture of tetraethyl lead.

Fig. 1A illustrates an alternate strainer for use in the apparatus of Fig. 1.

Figure 2 represents a sketch of the process steps.

In Figure 1, a fluid propulsion reaction chamber is represented by 5. This is in the form of a somewhat oval or elliptical loop, having a 180° upper return bend 5A, a similar 180° lower return bend 5B, and straight vertical connecting pipes 5C and 5D. This chamber is in the form of an endless conduit of uniform circular cross section.

A vertically disposed conical feed hopper 1, which is closed at the top by the removable cover 2, communicates at its lower end with the constant volume feed mechanism 3, which in turn communicates with the throat portion of the downwardly inclined injector (Venturi) feed tube 4. This feed tube is arranged to discharge substantially tangentially into the lower curved portion of the chamber 5.

The chamber 5 is provided with a plurality of substantially tangentially disposed high velocity fluid jets 7, which are in communication with the fluid reactant supply tank 14 through pump 16, heater 17, and chamber 18. Tank 14 is equipped with a feed line 15.

An exhaust line 8 communicates with the chamber 5 at the inner periphery and near the point where the upper semi-circular member 5A joins with the vertical descending member 5D, thereof. The other end of the exhaust pipe 8 communicates substantially tangentially with the side of the low velocity cyclone separator 9. This separator is provided with an annular arrangement of downwardly directed spray nozzles 10, positioned above the point of communication of the exhaust line 8. The top of the cyclone separator is equipped with a partial condenser 12, and also communicates serially with the final condenser 13. Final condenser communicates with the fluid reactant feed tank 14.

The lower end of the cyclone separator 9 communicates with a closed chamber 11 which is equipped with a strainer 19 (or the alternate strainer 19A of Fig. 1A). The strainer 19 communicates with the stripping column 20 (which may be of the multiple tray, or packed tower type). The column 20 communicates at its lower end with the reboiler 21. The reboiler 21 is equipped with a product removal seal pipe 22.

The chamber 11 communicates with an upwardly inclined helical ribbon-type conveyor 25, which conveyor in turn communicates with a storage vessel 26. The conveyor 25 is equipped with an annular heating jacket 27 at the upper end thereof. Conveyor 25 also communicates with a vapor line 28, at a point below the heating jacket 27, and it also communicates with a backwash line 30, at a point below the vapor line 28.

A solvent supply tank 24, which is equipped with a feed inlet (not shown), communicates through pump 29 with line 30. Line 30 also communicates with the annular spray nozzles 10 through line 31. Tank 24 also communicates with the upper part of the stripping column 20 through line 32. The upper part of stripping column 20 communicates with condenser 23 through line 28, and this condenser in turn communicates with tank 24.

Figure 2 schematically illustrates the process. A fluid reactant and a solid reactant are brought together in the reactor, under reaction temperature and pressure conditions, with high speed fluid propulsion agitation. Reaction, attrition of solid particles and classification of solid particles occur in the reactor. A substantially completely reacted and finely divided part of the reaction mixture is passed from the reactor to a separator wherein the desired product is separated. In addition, unconsumed fluid reactant may be separately recovered, and unconsumed solid reactant collected as or in a residue.

Other types of curved path reaction chambers in which turbulent flow or agitation and classification may occur are suitable. The cross section need not be tubular or cylindrical. Spiral, helical, reversed curve, annular, multistage, and the like shaped reaction vessels may be employed. Combinations of tubular and vortex type chambers may be used.

If desired, fluid propulsion jets may be positioned so as to increase, decrease or otherwise modify the flow in the chamber, e. g., to modify any double inverse helical flow therein.

In one embodiment, the process of the invention may be applied to the manufacture of tetraethyl lead by the reaction of lead-sodium alloy and ethyl chloride. Tetraethyl lead is of great commercial importance and it is consumed in large quantities as an ingredient in gasoline and the like internal combustion engine fuels.

Various methods have been proposed heretofore for the manufacture of tetraethyl lead, e. g., from lead-sodium alloy and ethyl chloride. One type involves charging a batch of the (about 90% lead—10% sodium) alloy into a reaction vessel and treating this with a batch or a continuous or intermittent stream of ethyl chloride. The reaction vessel may be in the form of an autoclave equipped with a rotary stirrer, or a rotating ball-mill, or similar batch type apparatus. These prior processes are subject to many drawbacks. They involve long reaction periods and leave much to be desired as to yields. The alloy particles and the sodium chloride by-products of the reaction tend to agglomerate into larger lumps, and thus a substantial amount of the alloy is shielded from contact with the ethyl chloride reactants. In addition, the agglomerated mass retains a substantial amount of the tetraethyl lead product, and the recovery of the product therefrom is tedious and wasteful.

There is considerable hazard involved in large batch operations containing a large charge of the alloy. The reaction may occur with explosive violence. If moisture should happen to come in contact with the alloy, an explosion may occur. Where the process is conducted under pressure, there is considerable health hazard from any of the highly toxic tetraethyl lead vapors which might escape from the various valves, stuffing boxes and mechanical closures involved in batch type reaction vessels.

In accordance with the invention, it has been found that the above drawbacks may be overcome and the tetraethyl lead produced in a commercially more advantageous manner.

A preparation of tetraethyl lead is given as an illustrative example of an application of the invention. The reactant in solid form is an alloy consisting of about 12.5% by weight of sodium and about 87.5% by weight of lead. This alloy may be conveniently pre-formed into substantially spherical shape, i. e., shot, in a conventional shot tower. Alternatively it may be crushed or otherwise brought to a coarse grained size, preferably to pass through a 4 mesh test sieve. It is desirable to coat the alloy with kerosene or like oily material so that it may be handled and transported more safely.

The hopper 1 is charged with the 4 mesh alloy, and the cover 2 is put in place. The fluid supply tank 14 is filled with ethyl chloride. Ethyl chloride is maintained in the chamber 18 at a pressure of about 100 lbs. per square inch gauge and a temperature of about 180° F. The alloy is fed into the reaction chamber 5 by means of the feeder mechanism 3 and the feed line 4 (including the ethyl chloride jet from line 6). Ethyl chloride is also injected through jets 7.

Both the amount of the ethyl chloride and that of the lead used are in excess of the stoichiometric requirements. Preferably, the amount of ethyl chloride is chosen so as to impart an average linear velocity of about 10 to 100 feet per second within the reaction chamber, i. e., turbulent flow. This causes vigorous agitation therein, due to the high energy collisions of the solid particles, rapid chemical erosion or attrition, or both, of the solid particles; and also a classification or separation of the substantially completely reacted and finely divided material from the coarser and less completely reacted material. The pressure at the jets in the reaction chamber is high, relative to the pressure in the cyclone separator 9.

The reaction temperature is preferably maintained at about 120° to 140° F. Reaction of the ethyl chloride and the alloy occurs rapidly at the effective contact surface. The propellant fluid is introduced through jets 7 tangentially in the region where the reactants are subjected to the highest compression, which compression is associated with the centrifugal force resulting from the curved path movement of the rapidly traveling particles. The high compression is believed to intensify the reaction, and the turbulent flow movement imparted to the particles of the fluid propellant which is tangentially introduced from the outer periphery of this region insures that the reacting surface is rapidly renewed and also rapidly increased by removal of any shielding coating and by the attrition of the alloy particles due to the high energy collisions in the reaction chamber. As the reaction progresses, the particle size of the alloy particles is also reduced by chemical erosion. The by-product sodium chloride does not lump up or occlude unreacted alloy or finished reaction product, and it is maintained in a finely divided state. The alloy particles may travel around the reaction chamber one or more times in being reduced to a substantially completely reacted and finely divided form.

A substantially completed reacted and finely divided portion of the reaction mixture travels near the inner periphery of the chamber 5, and is withdrawn through exhaust line 8. This withdrawn portion is then processed to recover tetraethyl lead, unconsumed ethyl chloride, and a residue which may contain recoverable lead. In one embodiment, the withdrawn reaction mixture is passed to the low pressure cyclone separator 9 and sprayed with acetone (from tank 24 through the spray nozzles 10). The ethyl chloride vapor undergoes a scrubbing due to the effect of the partial condenser 12, and then passes upward to the condenser 13, where it is condensed and returned to the ethyl chloride tank 14. Additional make up ethyl chloride may be introduced through line 15, if necessary.

The acetone solution of tetraethyl lead plus the solid residue passes to chamber 11. The acetone solution, which may percolate through the mass of residue particles which may cover the strainer and is removed therefrom through strainer 19, passes to the stripping column 20. The acetone is vaporized, and the vapor passes to condenser 23, is condensed, and then passes to acetone solvent tank 24. Finished tetraethyl lead is removed through line 22.

The solid residue passes from chamber 11 to the conveyor 25 wherein it is back-washed with acetone, supplied through line 30. It is then heated at a temperature of about 200° F. to expel acetone vapors and impart a final drying effect to the spent alloy. The acetone vapor passes up to the condenser 23, is liquified, and then passes to tank 24. The spent alloy passes to chamber 26. It may be removed and processed to recover any lead therein, in accordance with known procedures.

The reaction chamber 5 may be supplied with a temperature regulating jacket, or set in a temperature regulating bath, in order to regulate the temperature thereof. Where the ethyl chloride is present as a vapor in the reaction chamber, the expansion of the ethyl chloride leaving the jets is accompanied by a refrigerating effect. This may be adjusted so as to control the temperature of the reaction system, i. e., absorb the heat evolved by the exothermic chemical reaction in the formation of the tetraethyl lead.

The acetone spray in the separator serves to strip tetraethyl lead from the vapors as well as to help settle the spent alloy particles and by-product, sodium chloride. The effect of the partial condenser 12 is to further strip tetraethyl lead from the vapors of ethyl chloride.

It has been found that the recovered and recirculated ethyl chloride tends to give a higher yield of tetraethyl lead, than does fresh ethyl chloride. It is thought that some material carried over in the recovered ethyl chloride has a beneficial effect on the reaction.

The process may be carried out in apparatus which includes heat exchange devices; e. g., to use the heat contained in the ethyl chloride vapor to preheat fresh ethyl chloride liquid.

The reactant in fluid form may contain a diluent or solvent and should be readily flowable in order that sufficient propulsion may be obtained without giving unduly high pressures. If the reactant is in the form of a liquid, it is preferable that the viscosity thereof should not be higher than that of an about S. A. E. 50 motor lubricating oil at ordinary room temperatures.

The reaction may be conducted with the fluid reactant in either the vapor phase or the liquid phase.

In an illustrative vapor phase operation, a Figure 1 type of apparatus is used with a reaction chamber of 1.45 sq. inch inner cross sectional area, the top and bottom turns of a radius of curvature of 6 inches, and the vertical connectors 26 inches in length; the feed tube is of the same inner cross sectional area as the reaction chamber, and five 1/8 inch jets are used. In an illustrative liquid phase operation, a Figure 1 type of apparatus is used, having 0.30 sq. inch cross sectional area, 3 inch radius of curvature upper and lower bends, and 18 inch vertical connectors; the feed tube is of the same inner cross sectional area as the reaction chamber, and three 1/8 inch jets are used. The following are representative operation conditions:

|  | Vapor Phase | Liquid Phase |
|---|---|---|
| Duration of Run | 1 hour | 30 minutes. |
| Weight of Alloy Charged | 145 lbs. | 24 lbs. |
| Composition of Alloy | 10% Na, 90% Pb | 10% Na, 90% Pb. |
| Reactor Temperature | 125° F | 125° F. |
| Pressure at Reactor Inlets | 100 p. s. i. g.[1] | 148 p. s. i. g. |
| Pressure at Reactor Outlet | 4.8 p. s. i. g. | 4 p. s. i. g. |
| Total Ethyl Chloride Charged | 3,933 lbs | 2,180 lbs. |
| Rate-Ethyl Chloride Feed | 65.5 lbs./min. | 73 lbs./min. |
| Tetraethyl Lead Produced | 39 lbs. | 6.3 lbs. |
| Yield Based on Sodium consumed. | 76% | 75%. |
| Ethyl Chloride Consumed | 33 lbs | 5.5 lbs. |
| Yield Efficiency Based on Eth. Ch. | 94% | 91%. |
| Average Size of Alloy Feed | 4 mesh | 10 mesh. |
| Average Size of Lead Residue | 5 microns | 25 microns. |
| Velocity at Reactor outlet | 70 F. P. S.[2] | 10 F. P. S. |

[1] Pounds per square inch gauge.
[2] Feet per second average linear mass velocity.

It is indeed surprising that this reaction can be carried out so readily in accordance with the above described procedure, and in such unexpectedly high yields. In the case of a process of preparing tetraethyl lead from the lead sodium alloy and ethyl chloride in a ball-mill, the alloy tends to clinker up into lumps which contain unreacted alloy particles and by-product sodium chloride and also occlude some tetraethyl lead. There is also a tendency for a caking or coating of the balls (to form lumps) in the mill, and this will similarly isolate the two reactants from each other and occlude the reaction product so as to make recovery thereof difficult.

In the normal operation of the above described process, there will be no appreciable health hazards from the escape of tetraethyl lead vapors. The high pressure part of the reaction system, wherein tetraethyl lead occurs, is completely closed. If desired, the pumping units may be completely submerged within the corresponding tanks, in order to avoid possible leakage of liquid from any stuffing boxes or rotary shaft seals. If desired, the condensing units and tanks may be set at a suitable height relative to the remainder of the apparatus, so that the static pressure of the liquid will be sufficient for movement of the liquid without the use of pumps.

Other proportions of lead to alkali may be used in the alloy, e. g., containing more than about 12.5% sodium. The alloy may be made up from one or more alkali metals, e. g., mixtures of alkali metals may be used. Other organic halides may be used, e. g., ethyl bromide, and other solvents than acetone may be used; as the art will readily appreciate in view of the above descriptions. A higher boiling fraction of gasoline may be used as a solvent; and the solvent solution of the tetraethyl lead could be directly blended with gasoline to give a desired motor fuel.

If desired, known promoters or catalysts may be included in the reaction mixture. Ferric chloride or anhydrous aluminum chloride may be suspended in an inert vehicle, such as a petroleum distillate, and introduced in controlled amounts into the reaction chamber at a convenient point.

If desired, the ethyl chloride vaporizing and condensing apparatus may be replaced by a mechanical apparatus for developing the required pressure. Alternatively, an inert gas such as nitrogen may be employed as the fluid propulsion agent. In this case, the amount of the organic halide would be about sufficient to complete the chemical reaction. The fluid reactant could be introduced in one set of one or more jets; and the fluid propulsion agent, e. g., nitrogen in another set of one or more jets.

If desired, the above described product separation and recovery system may be replaced by conventional quenching and steam distillation methods. For instance, the mixture of tetraethyl lead and spent alloy can be discharged from the lower end of the cyclone separator 9 into a chamber containing a plurality of steam jets and then to a second cyclone separator, wherein the spent alloy particles are separated by a gravity effect, while the steam and tetraethyl lead vapor are removed, condensed, and the two immiscible liquids separately removed from the condensate.

In another application of the process of the invention, solid, coarse grained calcium carbide is reacted with nitrogen gas at a temperature of about 400° C., to prepare solid calcium cyanamide. The reaction chamber may be made of a special alloy, e. g., 18% nickel, 8% chromium, ½% molybdenum, and the rest iron. The reaction is readily controlled, and gives a good yield of a uniform product. The requirement of a water treatment to remove unreacted calcium carbide is substantially eliminated or reduced.

Another application of the invention is in the reaction of solid, coarse grained calcium cyanamide with wet steam containing about ½% sulphuric acid (based on weight of steam) at about 100° C. to prepare solid urea and a by-product calcium compound. The reaction is relatively smooth and readily controlled, and gives a desirably uniform product. The urea may be recovered by leaching with water and separating from the residue mud, in accordance with known procedures.

Another application of the process of the invention is in the reaction of solid alumina with solid carbon and nitrogen gas to prepare solid aluminum nitride and carbon monoxide. The nitride may be separated from the gas, by e. g., by gravity method, and then hydrolyzed with water to give ammonia and aluminum hydroxide, both of which are desirable products. The process gives an even mixture of the alumina and the carbon, and avoids the coating of the alumina particles by a layer of the nitride. Good yields are obtained.

Another application of the process of the invention is in the treatment of solid coke with steam containing about 2% of phosphoric acid (based on the weight of steam) at about 1100° F. to produce active carbon. The product may be used as a gas adsorbent carbon or as a liquid treatment carbon. The process avoids the very undesirable clinker formation, and also avoids the necessity of pelletizing the coke.

Another application of the invention is in the treatment of solid phosphate rock with sulphuric acid in the preparation of phosphoric acid and a calcium sulphate by-product. The acid may be separated from the mud in accordance with known procedures.

Another application of the invention is in the treatment of concentrated ilmanite (or rutile) with concentrated sulphuric acid to prepare titanium sulphate. The latter may be separated from the by-products, diluted with water and boiled to precipitate titanium dioxide, in accordance with known methods. The reaction is smooth and readily controlled, and the tendency of the sludge to slow up the reaction is substantially removed.

Another application of the invention is in the reaction of solid, coarse grained sulphur with chlorine gas at about 35–50° C. and atmospheric pressure to prepare sulphur monochloride. The reaction is very rapid and smooth, and gives good yields of a better product than prior art processes. The product is relatively free from unreacted sulphur.

Another application of the invention is in the reaction of coarse grained magnesium metal with liquid ethyl chloride to prepare the Grignard reagent. The reaction is relatively rapid and smooth and readily controlled. If desired, ethyl ether could be used to wash the Grignard from the unreacted magnesium metal.

Another application of the invention is in the treatment of a carbohydrate with mixed acid (e. g., nitric and sulphuric acid) to prepare oxalic acid. The oxalic acid may be separated from the residue by filtration or gravity separation, in accordance with known methods. Suitable carbohydrates are sawdust, cotton linters, starch or grain.

Another application of the invention is in the treatment of milo maize with dilute aqueous hydrochloric acid at about atmospheric temperature and pressure to divest the seed coat and to hydrolyze the starch to give invert sugar. The sugar may be separated from the residue by gravity, in accordance with known methods. This eliminates the difficulty encountered in treating such seeds in a Fuss mill (lumping and caking etc.) and the final product is obtained in one operation without the need of large digesting tanks.

Another application of the invention is in the reaction of solid calcium carbide with water vapor containing an acid, such as hydrochloric or acetic, to give the vinyl ester of the acid. The ester may be separated from the by-product by gravity means. The reaction proceeds at about 50° C. and is readily controlled. A good quality product is obtained.

Another application of the invention is in the treatment of solid sodium phenate with carbon dioxide to produce sodium salicylate, at about 150° C. and at elevated pressure. The reaction is fast and gives a desirable product in good yields.

In view of the foregoing disclosures, the art will appreciate that other methods may be used to bring together the reactant in solid form with the reactant in fluid form so as to achieve the benefits of high speed fluid propulsion, while the reaction is in progress, together with maintaining the solid reactant in active contact with the fluid reactant; e. g., by a shearing or cleaning action to remove any shielding coating, or by an attrition of the solid particles to present clean solid reactant surface; and classifying or separating substantially completely reacted and finely divided material from the reaction zone. In view of the foregoing disclosures, variations and modifications of applications of the invention will be apparent to those skilled in the art; and the invention contemplates all such other methods, variations and modifications except as do not come within the appended claims.

I claim:

1. A process for the preparation of alkylated lead comprising mixing coarsely divided lead alkali metal alloy and alkyl chloride under high speed agitation, induced by fluid propulsion, in a substantially vertical elliptical path under reaction temperature and pressure conditions, the reactants being subjected to the greatest centrifugal compression in a region of highest compression at the lower end thereof, said highest compression region resulting from the tangential introduction of a fluid propellant from the outer periphery of said path, whereby the reaction is intensified and fresh reactant surfaces are maintained, and separating the alkylated lead product from unreacted alkyl chloride and from residue.

2. A process of claim 1 which is carried out in a continuous manner and wherein the alloy is in the form of about 4 mesh particles.

3. The process of claim 2 wherein the reaction mixture contains a catalyst and the alkyl chloride is in the form of a liquid.

4. A process of claim 3 wherein the alkyl chloride is ethyl chloride.

5. A process of claim 4 wherein the high speed agitation is induced by an inert gas propellant.

6. A process of claim 4 wherein the removed more finely divided portion of the reaction mixture is contacted with a solvent for tetraethyl lead, and a solution of tetraethyl lead in said solvent is separated from unreacted ethyl chloride and from the residue.

7. A process of claim 2 wherein the alkyl chloride reactant is in the form of a vapor.

8. A process of claim 7 wherein the alkyl chloride is ethyl chloride.

9. A process of claim 8 wherein the removed more finely divided portion of the reaction mixture is contacted with a solvent for tetraethyl lead, and a solution of tetraethyl lead in said solvent is separated from unreacted ethyl chloride and from the residue.

10. A process of claim 8 wherein the reaction mixture contains a catalyst and the high speed agitation is induced by an inert gas propellant.

11. A process of claim 10 wherein the reactant mixture moves with an average linear velocity in the range of 10 to 100 feet per second.

ROBERT STANTON.

REFERENCES CITED

The following references are of record in the file of this patent:

UNITED STATES PATENTS

| Number | Name | Date |
| --- | --- | --- |
| 1,974,167 | Voorhees | Sept. 18, 1934 |
| 2,237,091 | Stephanoff | Apr. 1, 1941 |
| 2,310,806 | Nourse | Feb. 9, 1943 |
| 2,351,091 | Bar | June 13, 1944 |
| 2,385,508 | Hammond | Sept. 25, 1945 |
| 2,391,723 | Mann | Dec. 25, 1945 |